United States Patent [15] 3,675,113
Bader et al. [45] July 4, 1972

[54] SYSTEM FOR THE GENERATION OF ELECTRICAL POWER HAVING A SPRING POWERED PRIME MOVER RESPONSIVE TO OUTPUT VOLTAGE

[72] Inventors: Clifford J. Bader, West Chester; Richard P. Branco, Bridgeport, both of Pa.

[73] Assignee: Burroughs Corporation, Detroit, Mich.

[22] Filed: Nov. 24, 1971

[21] Appl. No.: 201,638

[52] U.S. Cl...................................322/28, 185/38, 290/1 E, 317/21, 322/38, 322/40
[51] Int. Cl.........................................................H02p 9/04
[58] Field of Search.........................322/14, 15, 28, 38, 40; 290/1 R, 1 E; 317/21; 185/38

[56] References Cited

UNITED STATES PATENTS 2,303,115  11/1942  Eidmann et al.....................322/40 X
3,354,383  11/1967  Weismann...........................322/38 X Primary Examiner—Lewis H. Myers
Assistant Examiner—H. Huberfeld
Attorney—Edward J. Feeney, Jr.

[57] ABSTRACT

The present disclosure describes a system for providing a non-volatile electrical energy source which employs a finite source of mechanical energy, metered in accordance with the electrical power demands of the utilization device. A basic embodiment of the system contemplated by the invention as a replacement for the volatile electro-chemical storage battery with its limited shelf life, comprises a spring-wound generator, electrical energy storage means, and electrical latching means controlled by upper and lower voltage limit sensors for metering out the mechanical energy of the spring as a function of the level of electrical energy present at any given time in the storage means.

10 Claims, 6 Drawing Figures

INVENTORS.
CLIFFORD J. BADER
RICHARD P. BRANCO

BY Francis A. Varallo
AGENT

INVENTORS.
CLIFFORD J. BADER
RICHARD P. BRANCO
BY
Francis A. Varallo
AGENT

SYSTEM FOR THE GENERATION OF ELECTRICAL POWER HAVING A SPRING POWERED PRIME MOVER RESPONSIVE TO OUTPUT VOLTAGE

BACKGROUND OF THE INVENTION

While electric batteries are suitable for many purposes, applications exist where the decline of available power inherent in such batteries during extended shelf life or in service where only intermittent power is required over a long period of time, cannot be tolerated. The present invention provides a source of electrical power whose output level is unaffected by the passage of time but rather is a function of the mechanical energy present in the system. The rate at which this mechanical energy is expended is in turn a function of the electrical load requirements. The power source provided by the present invention is especially suited for applications requiring extreme ruggedness and long term untended operation. Recent advances in the development of low power drain integrated and discrete electronic components have further broadened the scope of such applications. Thus, it is possible to design electronic circuits with operational amplifiers having current drains of one or two microamperes, and with complementary MOS logic having virtually zero drain except during level transitions.

In considering the conversion of mechanical energy to electrical energy either of two basic modes of operation may be selected, namely electrostatic (piezoelectric) or electromagnetic. The former mode possesses certain favorable characteristics, such as simplicity and compatibility with high load impedances. However it has the disadvantage of employing rather fragile piezoelectric crystals which are incapable of withstanding severe shock and vibration conditions. Moreover, basic hardware requirements for a system utilizing electrostatic conversion are not readily available and must be custom manufactured. In contrast, induction generators utilize rugged, easily obtainable materials that offer a greater selection of possible physical configurations. Practical units, however, tend to adapt more readily to low impedance loads.

The present invention utilizes the magnetic approach to the conversion problem. In determining by mathematical calculation the limitations of power generation by means of electromagnetic induction, and making use of realistic physical size constraints, a number of facts emerge. First, the smallest practical generator at reasonable efficiencies produces currents on the order of milliamperes, rather than microamperes. Second, the generation of voltages on the order of a few volts, with practical generator dimensions, wire size, and number of turns, requires speeds on the order of several hundred revolutions per minute. Third, the use of voltage multiplying techniques, such as the interrupted-primary magneto, is not practical in very small units since the inherently short time constants involved limit the degree to which flux can be excluded and suddenly admitted. Voltage multiplication can be obtained only at a loss of efficiency because only a small portion of the available flux can be utilized. Finally, at very light loads, efficiency deteriorates rapidly because core losses do not change. The core loss is proportional to speed and thus, to voltage.

Two basic modes of operation were considered for the generator. The first of these modes suggests that the generator be run at a constant speed of a few hundred revolutions per minute to secure adequate voltage. Such continuous operation is impractical because the gear ratios associated with practical springs become extremely high. Moreover, the core losses in this type of operation become prohibitively large.

As an alternative, a second intermittent mode of operation may be employed, together with capacitive storage of energy in the non-operating intervals, so that energy may be delivered at a high rate. One well known type of intermittent motion is that provided by an escapement, where rotation of the output shaft takes place in discrete steps governed by a timing device such as a torsional pendulum. The time between steps is limited by the mechanical oscillation periods obtainable. For small size devices, the time between steps is relatively short and periods of one second or less are practical. This escapement type of intermittent operation offers the advantage of a relatively high rate of rotation during the active period, so that sufficient voltage may be generated, while the average losses are kept to a minimum. This advantage however is outweighed by several serious disadvantages. Considerable energy is wasted in the acceleration of the mechanical parts since the kinetic energy is dissipated when the mechanism is suddenly stopped. Also, the balance-wheel escapement is inherently fragile and not suited for rugged environmental conditions. Finally, a high torque is required if reasonable output shaft speeds are to be attained in the short time available for acceleration.

The present invention utilizes a finite source of mechanical energy to power an electrical generator in an intermittent operating mode. The aforementioned disadvantages of the balance-wheel escapement are obviated by the substitution therefor of an electrical latching mechanism. A principal advantage of such electrical latching is that very much longer periods may be attained. This results in a sizeable reduction of the integrated loss of energy due to acceleration of the mechanical parts over a given time period. Moreover, there is ample time for acceleration at low torque levels. Another very significant advantage is that in contrast with the unconditional action of the escapement, the electrical latching technique of the present invention insures that both the running and non-running times of the generator may be keyed to the electrical power demand, so that no mechanical energy is wasted by unnecessary generator operation. The latch mechanism, since it is operated less frequently than the escapement, may be ruggedly constructed, to withstand extremely high shock and vibration requirements.

SUMMARY OF THE INVENTION

The electrical generating system of the present invention is best described in connection with the basic embodiment presented hereinafter. However it should be understood that the scope of the invention is not to be considered limited to such embodiment. For example, the generator itself may take many forms well known to electrical designers, which in accordance with particular applications may be equivalent, or even preferred, to the basic generation configuration chosen herein for purposes of description. Similarly, the finite source of energy used to power the generator may be of different types.

In accordance with the invention, a generating system is provided which incorporates a generator having a permanent-magnet rotor driven through a gear train by a coiled spring. The generator has a fixed stator (armature) with a single stator winding disposed thereon. No commutator is present, and conversion to DC is accomplished by means of solid state rectification. Electrical energy is stored in a capacitor for delivery to the load.

A pair of voltage sensing means are provided which are responsive respectively to predetermined upper and lower output voltage limits. In operation, the starting and stopping of the generator is accomplished by way of a polarized double latching solenoid which is toggled from one state to its opposite state by an impulse from the appropriate voltage limit sensor. The sensors draw no static current. Actuation of the sensors takes place in accordance with the electrical demand of the utilization device, and the metering out of the mechanical energy of the coiled spring to achieve proper output voltage levels is a function of the latching means.

The system configuration and operational details given above have been presented in simplified form. Other features of the invention will become more fully apparent in the detailed description presented hereinafter.

DESCRIPTION OF THE PREFERRED EMBODIMENT

Figure 1:
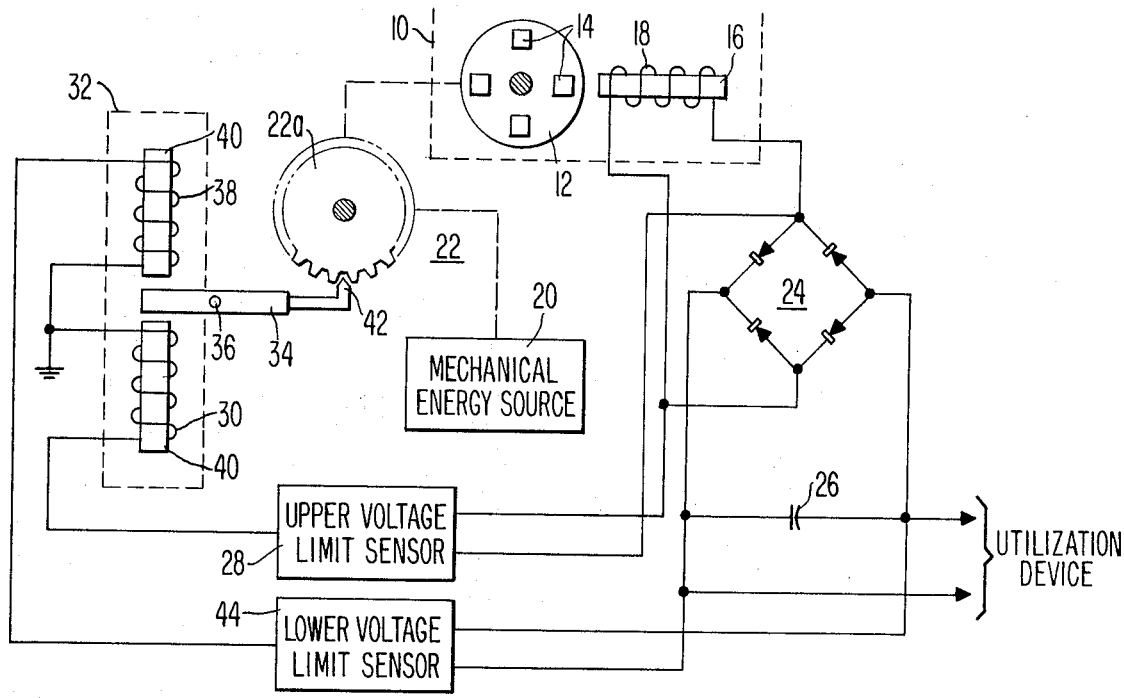
FIG. 1 is a representation of the organization of the principal parts of the generating system of the present invention.
Figure 5:
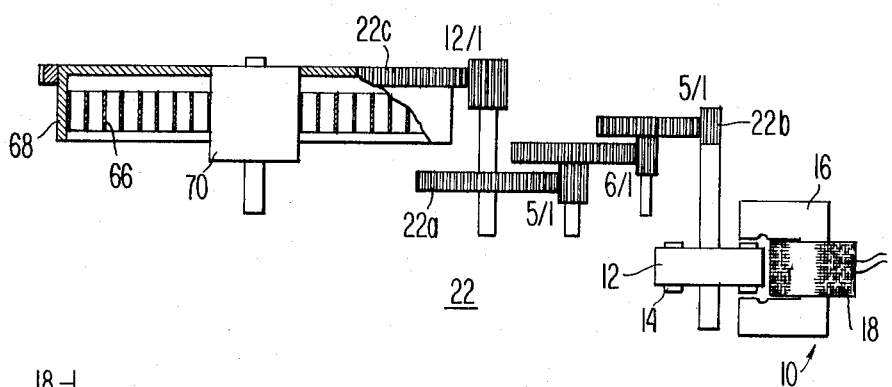
FIG. 5 illustrates a representative gear train for use in the system of FIG. 1 for the conversion of power from the source of stored mechanical energy to the electrical generator rotor.

FIG. 1 illustrates the basic configuration of the invention by means of block diagrams and schematic representations. The electrical generator 10 comprises a rotor 12 bearing permanent magnets 14 and a stator (armature) 16 having a stator winding 18 disposed thereon. Mechanical power to drive the rotor 12 is supplied by a finite source of mechanical energy 20 such as a flat coiled spring (as shown in FIG. 5), or weights such as those used to power certain clock mechanisms, and this power is transmitted to the rotor through a gear train 22 as indicated by the dashed lines connecting the energy source 20 and the generator rotor 12. Gear 22a is an intermediate gear of the train 22. FIG. 5 illustrates in detail a gear train 22 suitable for power conversion in the system of FIG. 1.

As the permanent magnet rotor 12 rotates, it carries with it lines of force which sweep through the armature 16 cutting the stator winding 18 and inducing an alternating voltage therein. This last voltage is applied to solid state rectifier 24 comprising four diodes arranged in a full-wave bridge configuration, the output of which appears across energy storage capacitor 26. The utilization device is connected to the terminals of capacitor 26.

In operation, assuming that the coiled spring has been prewound, the release of the gear train allows the generator to commence running. The generator continues to run until a predetermined upper voltage has been reached as evidenced by the charge on capacitor 26. At this point, the upper voltage limit sensor 28 (described more fully hereinafter in connection with FIG. 4) applies an electrical pulse to stop winding 30 of the polarized latching solenoid 32. The latch lever 34 itself shown pivoted about point 36 is a permanent magnet. The solenoid 32 includes, in addition to stop winding 30, a start winding 38. Each of these windings is disposed about a core 40 of soft magnetic material. Although shown schematically as two independent core sections for ease of description, core 40 may be of the unitary C-configuration illustrated in FIG. 3. The pulsing of the stop winding 30 causes its associated core to be magnetized momentarily in such a direction that the magnetic pole of the latch is attracted to the last-mentioned core. Upon cessation of the stop pulse and its resultant magnetic field in the core, the latch remains in the last-mentioned position due to its own permanent magnetism. Concurrently, the opposite end of latch 34 which is shaped in the form of a tang 42 has pivoted to engage a tooth on one of the intermediate gears 22a of the gear train 22, thereby stopping the generator.

The system will remain in the quiescent condition for an unlimited period of time if no electrical power is drawn from the energy storage capacitor 26. On the other hand, if power is consumed by the utilization device, the voltage level on the capacitor 26 will begin to decline. When the output voltage has reached a predetermined lower limit, the lower voltage limit sensor 44 (described more fully hereinafter in connection with FIG. 4) will supply a pulse to start winding 38 of solenoid 32. The pulsing of start winding 38 causes its associated core to be magnetized momentarily in a direction to attract the magnetic pole of the latch 34 in its vicinity. As in the case of the stop mechanism, cessation of the start pulse and termination of the magnetic field in the core, does not affect the position of latch 34 which remains drawn to the soft magnetic material of the core by its own magnetism. The tang 42 is drawn away from engagement with the teeth of gear 22a and the generator 10 resumes running until the voltage on capacitor 26 reaches the predetermined upper limit. At this point, the upper voltage sensor 28 stops the generator operation and an operational cycle is complete.

Figure 2:
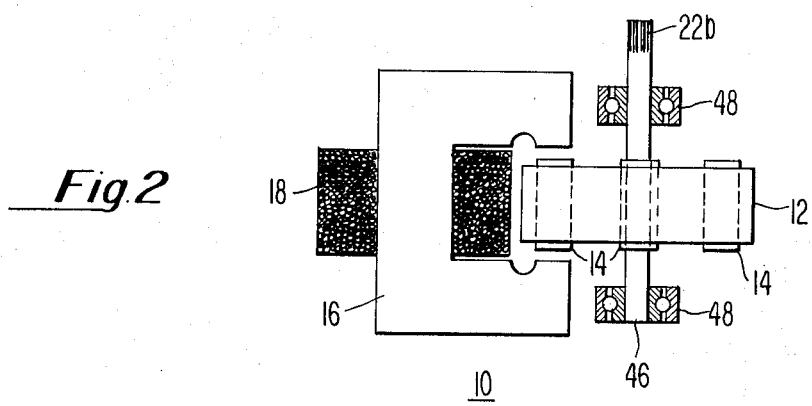
FIG. 2 illustrates the mechanical details of a basic generator which may be used in the system of FIG. 1.

FIG. 2 illustrates a simple mechanical configuration of the generator 10. The rotor 12 which is of nonmagnetic material contains a plurality of slots in which are embedded the permanent magnets 14. The rotor is mounted on one extremity of a nonmagnetic shaft 46 supported by bearings 48. A drive gear 22b is present at the opposite extremity of the shaft. Completing the generator is a C-shaped stator 16 having a stator winding 18 disposed thereon.

Figure 3:
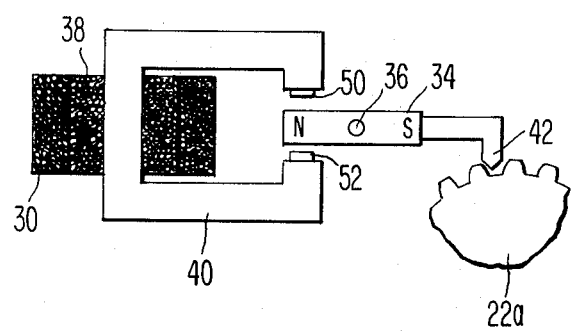
FIG. 3 illustrates the mechanical details of the polarized latching solenoid.

FIG. 3 depicts a polarized latch configuration. The latch 34 which is a permanent magnet having a polarity as indicated, is pivoted about a point 36 by any suitable means. The "N" pole of the latch is placed in the opening formed by the two legs of a "C"-shaped core 40. The stop or upper limit winding 30 and the start or lower limit winding 38 are shown disposed adjacent each other and are mounted about a common leg of core 40. A partial view of gear 22a is shown in relationship to the tang 42 of latch 34. In practice, the windings 30 and 38 are arranged such that current flow therethrough provided respectively by the upper and lower voltage limit sensors 28 and 44 causes opposite polarities at the core poles 50 and 52. In the specific arrangement of FIG. 3, this would mean that momentary energizing of stop winding 30 would cause core poles 50 and 52 to be magnetized to the "S" and "N" states respectively. This causes the "N" pole of latch 34 to be attracted upward toward pole 50, and the tang 42 to be inserted between the teeth of gear 22a thereby stopping the generator action. As mentioned hereinbefore, once displaced toward pole 50, the "N" pole of latch 34 will remain in this position even when the magnetism in the soft magnetic material of core 40 is terminated.

When more electrical energy is required, the lower voltage limit sensor 44 (FIG. 1) energizes start winding 38 causing the poles 50 and 52 to be momentarily magnetized respectively to the "N" and "S" states. The "N" pole of latch 34 is repelled by core pole 50 and attracted by pole 52, thereby causing the latch tang 42 to be withdrawn from the gear 22a and permitting the gear to rotate. This condition persists until the stopping of the generator action is ordered by the upper voltage limit sensor 28 (FIG. 1).

Figure 4:
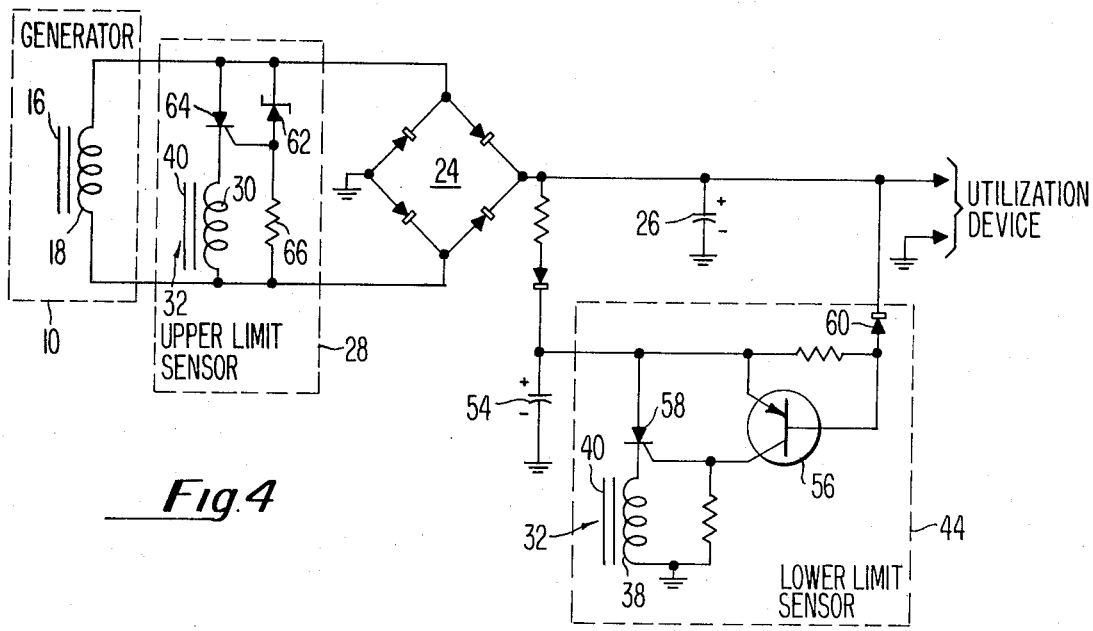
FIG. 4 is a schematic diagram of the electrical details of the generating system including the voltage limit sensors of FIG. 1.

The operation of the upper voltage limit sensor 28 and the lower voltage limit sensor 44 may be explained with reference to FIG. 4.

Assume initially that a preceding active cycle of generator operation has charged the energy storage capacitor 26 to a prescribed level and that capacitor 54 has been similarly charged. In a practical system, capacitors 26 and 54 have respective values of approximately 1000 and 10 microfarads. Capacitor 26 supplies electrical energy to the utilization device. Since the lower voltage limit sensor and solenoid latch must operate during periods when the generator is inactive, capacitor 54 supplies the energy needed for operation. This last capacitor also serves as a decoupled reference source, the level of which may be compared to the supply output appearing across capacitor 26. A transistor 56, a silicon controlled rectifier (SCR) 58 and a diode 60 are provided in the lower limit sensor 44. Transistor 56 and SCR 58 are normally nonconducting. When the power drain from the supply causes the output level on capacitor 26 to drop by an amount equal to the junction voltage drops in transistor 56 and diode 60, transistor 56 is biased to conduction. The voltage on the collector electrode of transistor 56, which electrode is connected to the gate electrode of SCR 58 rises from ground potential to a positive level. This triggers SCR 58 to conduction and the energy stored in capacitor 54 is discharged through the start winding 38 of the latching solenoid 32. As explained in connection with FIG. 3 this discharge current magnetizes core 40 of the solenoid in a direction to cause the latch tang 42 to release the gear train, thereby allowing the generator to run.

The generator output appearing on the stator winding 18 is applied directly to a bridge rectifier 24 as well as to the upper voltage limit sensor 28. The latter sensor includes a Zener diode 62 and a silicon controlled rectifier (SCR) 64. The magnitude of the "breakdown" or Zener voltage of diode 62 serves as an upper voltage limit reference. Initially as the lower limit sensor causes the generator to commence running, the energy storage capacitor presents a considerable electrical load to the generator. This in turn is reflected as a mechanical load which causes the generator to operate at less than full speed and output. However as the capacitor charges toward a level determined by the rated generator output and taking into account the voltage drop in rectifier 24, a point is reached where the generated peak potential of the alternating voltage appearing on the cathode of Zener diode 62 is equal to the Zener voltage. Zener diode 62 conducts in response to such potential. Since the anode of Zener diode 62 is coupled to the gate electrode of SCR 64, the voltage developed across resistor 66 as a result of such conduction, triggers SCR 64 to conduction. Current derived from the stator winding 18 itself is then directed through the stop winding 30, causing the latching solenoid 32 to be toggled in a direction to stop the generator. It should be noted that depending upon the response time of the solenoid, several pulses of current through stop winding 30, each occurring as Zener diode 62 is periodically driven to conduction by the generator peak output waveform of proper polarity, may be necessary to induce in core 40 an average magnetism sufficient in strength to actuate the latch.

FIG. 5 illustrates a power conversion subsystem comprising a power spring 66 with drum 68 and arbor 70, and a torque reducing gear train 22. Intermediate gear 22a has been arbitrarily designated as the gear selectively released or locked by the solenoid lever, as seen in FIGS. 1 and 3. The generator rotor 12 is fastened to one end of a shaft, the other end of which consists of a gear 22b. In a practical system, the pitch diameter of gear 22b was chosen to be 0.142 inches, while that of the ring gear 22c fastened to the drum 68 was 3.0 inches. The pitch diameters of the intermediate gears were selected in accordance with the ratios indicated in FIG. 5, to provide a total gear ratio of 1,800 to 1, from the rotor 12 to the drum 68.

It is believed helpful at this point in the description of the invention, to list the important generator parameters, and identify the calculations involved in the electrical and mechanical design of the system illustrated in the drawing. It should be emphasized however that the following parameters may vary according to the material, design or application, and are included solely for purposes of example, and should in no way be considered limitative of the invention described and claimed herein.

Details of the generator construction include the following:
Rotor: three-quarter inch diameter
Magnets (core cross-section): 0.2 inch square (0.5 cm)
Stator core length (magnetic path): 2 inches Hi-silicon steel (grain oriented) 10-mil laminations
Speed: 600 rpm
No. of magnets: 4
Assumed flux rise and fall times: 10 msec.(linear)
Max. flux density: 10,000 gauss
Core loss: 0.5 watt/lb at 40 Hz, 600 rpm
Winding resistance: 300 ohms
Winding: Approx. 2,800 turns, 042 wire Representative electrical design parameters and calculations are as follows:

$$E = NA \frac{dB}{dt} \times 10^{-8} = (2800)(0.5)^2(10)^6(10^{-8}) = 7 \text{ volts}$$

Supply end points: 3 volts "start"
5 volts "stop"
Rectifier diode drops: 1 volt (0.5 volts per diode)
Energy storage capacitor: 1,000 μF Assumed supply drain from the capacitor: 10 μA. From the basic relationship, i(the capacitor current) = $C\, dv/dt$, for $i$ = 10 μA and $C$ = 1,000 μF, the capacitor energy level will drop 1 volt for each 100 seconds of power drain.

Recharge interval based on discharging 2 volts, i.e., from 5 volts to 3 volts: 200 seconds (~3 min.)

Charging time: 1 time-constant divided by the duty cycle of a-c input.

Generated voltage: Approximately square wave, 12 msec. each polarity, repeated 40 times per second. Duty cycle 50 percent. Full wave rectified.

Peak current:

$$I_{peak} = \frac{E - [\text{Rectifier Drop} + \text{"Start" Supply Potential}]}{\text{Winding Resistance}}$$

$$= \frac{7 - [1 + 3] \text{ volts}}{300 \text{ ohms}} = \frac{3 \text{ volts}}{300 \text{ ohms}} = 10 \text{ mA}.$$

Average current: $I_{ave} = \frac{I_{peak}}{2} = \frac{10 \text{ mA}}{2} = 5 \text{ mA}$.

Power demand: 7 volts × 5 mA. = 35 mw. Core loss at 0.3 lbs./in.³ (density of steel): 12 mw. Total max. power demand: 35 mw. + 12 mw. = 47 mw.

Charge time: $\frac{1 \text{ time constant}}{\text{Duty cycle}} = \frac{0.3 \text{ sec.}}{0.5 \text{ duty cycle}} = 0.6 \text{ sec.}$ Assuming that full power must be supplied for 0.6 sec.

Energy ($e$) = 47 × 0.6 = 28.2 mw.-sec. Since 1 mw. = 8.85 × $10^{-3}$ in. lb./sec., 28.2 mw.-sec. yields 0.25 in. lb./charge. Total energy =0.25 in. lb./charge × 20 charges/hr. × 48 hrs. = 240 in. lbs. = 20 ft. lbs.

Torque demand: $T = \frac{e}{\theta} = \frac{0.25 \text{ in. lbs./charge}}{6 \text{ revs.} \times 6.28 \text{ radians/rev.}}$ $$= 0.0066 \text{ in. lbs.}$$

Considering the mechanical design of the system, the torque input required to the electrical generator is 0.0066 in. lbs. at 600 rpm every three minutes for a period of 0.6 seconds. The total energy required by the utilization device, the limit sensor circuits and the losses in the generator, over a nominal 48 hour period, is equivalent to 240 in. lbs. of mechanical energy. This energy is stored in a pre-wound flat-coil power spring such as spring 66 of FIG. 5.

The generator running time including time to accelerate and decelerate is about 1 second every three minutes, or about 1,000 seconds for 50 hours. At 600 rpm or 10 rps, the generator rotor must make a total of 10,000 revolutions during this period. The number of turns of the power spring required to produce the electrical energy is the gear ratio (1/1,800) multiplied by the total number of revolutions (10,000) which yields 5.55 turns.

The output torque supplied to the generator, referred to the drum 68 is 0.0066 in. lbs. multiplied by 1,800 which gives 11.88 in. lbs. The friction torque in the gear train is of the order of 0.7 in. lbs. Stated another way, the mechanical energy loss each time the system is cycled is about 6 percent of the total energy (240 in. lbs.). This increases the maximum energy required to approximately 255 in. lbs. and the torque output of the spring at the end of each cycle of useful life must be 12.6 in. lbs.

A flat-coil power spring that delivers at least 255 in. lbs. of energy during 5.55 turns above 12.6 in. lbs. of torque is required. The inside diameter of the drum is assumed to be limited to about 3.00 inches and the spring width of 0.375 to fit a particular configuration. For calculation purposes it is further assumed that the minimum torque required by the system (end of life) is 75 percent of the maximum solid torque. The maximum torque (Tm) is 16.8 in. lbs. Using tempered steel, AISI 1,095, Rockwell C49–51, the material thickness to produce the maximum torque will be 0.033 inches. The minimum arbor diameter should be 15 times the stock thickness. A 0.532 arbor diameter, which is greater than the 15 times specification, was utilized in the above-mentioned configuration. The total number of turns the spring will deliver is defined by:

$$N = \frac{\sqrt{2(D_S^2 + D_D^2)} - (D_S - D_D)}{2.55 t}$$

Where: $D_D$ = Drum Diameter = 3.00
$D_S$ = Arbor Diameter = 0.532
$t$ = Stock thickness = 0.033
Then $N$ = 9.5

Figure 6:
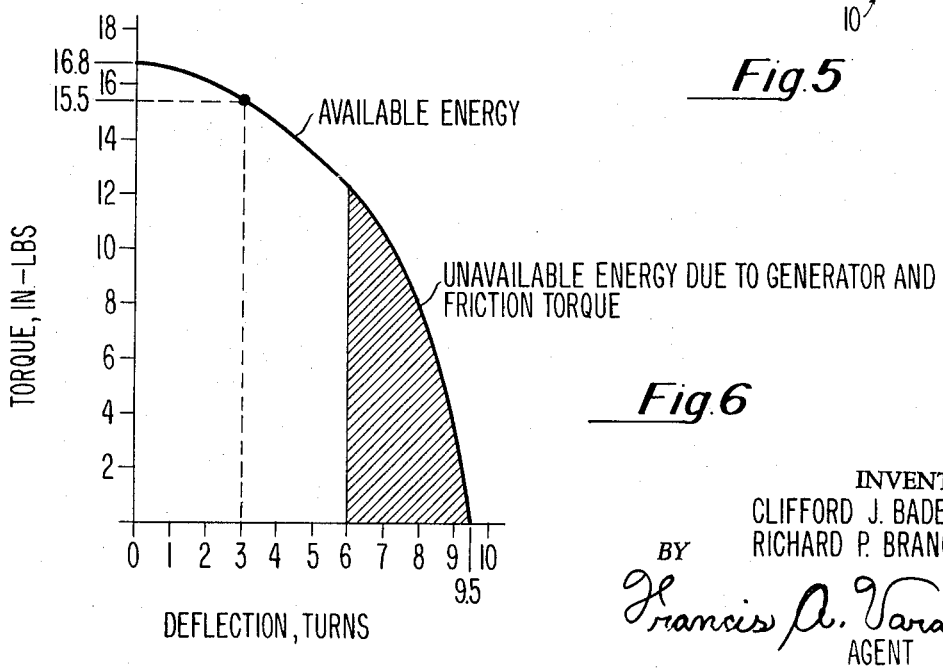
FIG. 6 is a representative load/deflection curve for a flat coiled spring which may serve as the energy source for driving the generator of FIG. 2.

FIG. 6 is the torque/deflection curve for the spring. The effective length of a flat coil spring changes as the spring unwinds, therefore, the torque versus deflection curve is not linear. The area under the curve can be approximated by assuming that the "average" torque equals two-thirds the maximum solid torque. The energy stored by this spring is: $E = 2/3\, Tm\, \theta = 668$ in. lbs., where $\theta$ is the angle in radians through which the torque is applied, and is equal to $N \times 2\pi$. The energy remaining in the spring at the end of 50 hours due to friction and minimum generator torque to develop the "motor stop" signal is 201 in. lbs. The total energy available to overcome the gear train and generator inertia and provide electrical energy is 467 in. lbs.

The original approximation of running time, 1 second every 3 minutes, was based on 0.4 seconds to start and stop the mechanical system. Actually, the time to accelerate the system is given by:

$$M_s - M_o = \omega_o/t\, (Ic).$$

where $M_s$ is the torque supplied by the spring referred to the high speed shaft. $M_o$ is the friction and output torque at the high speed shaft. $\omega_o$ is the output shaft speed, $t$ is the time to reach speed $\omega_o$, and $Ic$ is the composite moment of inertia of the system. $Ic$ may be approximated as $10 \times 10^{-6}$ in. lbs. sec$^2$ which is considered to be conservative for the present system. At the start of operation the time to generate the required voltage is $$t_{max} = \frac{62.8\, \frac{RAD}{SEC} \times 10 \times 10^{-6} \text{ in. lb. sec.}^2}{1/1800\, (16.8 - 12.6) \text{ in. lbs.}} = 0.27 \text{ sec.}$$

This time is compared to the time calculated by letting $M_o$ equal the friction torque only.

$$t_{min} = \frac{62.8 \times 10 \times 10^{-6}}{1/1800\, (16.8 - 0.7)} = 0.070$$

After 25 hours of operation or approximately 3 turns of the power spring drum, the torque out is 92 percent of the original torque or 15.5 in. lbs. Using this torque in the two conditions above:

$$t_{max} = \frac{62.8 \times 10 \times 10^{-6}}{1/1800\, (15.5 - 12.6)} = 0.39 \text{ sec.}$$

$$t_{min} = \frac{62.8 \times 10 \times 10^{-6}}{1/1800\, (15.5 - 0.7)} = 0.076 \text{ sec.}$$

The actual time to accelerate the generator lies between $t_{max}$ and $t_{min}$ because the computed input torque, 0.0066 in. lbs. (11.88 in. lbs. referred to the drum) was based on the assumption that no energy was transferred during the acceleration and the computed times assume that the load (0.0066 in. lbs.) is constant from 0 to 600 rpm.

The time necessary to stop the generator is a function of geometry since this will be accomplished by holding a tooth on one of the intermediate gears. The lock will be a lever inserted in a tooth actuated by the relay. Therefore, proper placement of lever pivot, inertia of the lever, and the lock shape will determine deceleration time. However, the above calculation demonstrates justification of the earlier approximations.

It should also be noted that it may be possible to reduce the drum diameter, varying parameters like gear train ratio, spring thickness, spring width, etc. For instance, with a given gear ratio, approximately 6 turns of the spring arbor are required. But torque is proportional to the spring thickness and the spring width. If the maximum solid torque was high and does not have to be cut off at 75 percent, then a higher gear ratio can be used and allow fewer turns of the arbor. It is also possible to fit a larger diameter spring with many more turns of the arbor available and a lower ratio gear train may then be used.

From the foregoing description and mode of operation, it should be apparent that the present invention provides an efficient and reliable nonvolatile electrical energy source, suitable as a replacement in selected applications for the electrical battery. While a practical embodiment of the invention has been presented herein, it should be understood that changes and modifications of the described arrangements may be needed to fit particular operation requirements. These changes and modifications, insofar as they are not departures from the true scope of the present invention, are intended to be covered by the claims appended hereto.

What is claimed is:

1. An electrical generating system comprising in combination a source of mechanical energy, generator means operatively connected to said source for converting said mechanical energy to electrical energy, storage means coupled to said generator means for storing said electrical energy, sensing means coupled respectively to said generator means and to said storage means for sensing predetermined upper and lower voltage limits of said generated electrical energy, electrical latching means coupled to said sensing means and operatively connected to said source of mechanical energy for metering out said mechanical energy in accordance with the level of energy present in said storage means.

2. An electrical generating system as defined in claim 1 wherein said electrical latching means includes a pair of latch windings inductively coupled to a core of magnetic material, means coupling said windings respectively to said sensing means, a pivotal latch having a magnetically polarized extremity positioned in proximity to said core of magnetic material and being operatively connected to control the transfer of mechanical energy from said source to said generator means, the energizing of one of said latch windings by said sensing means in response to the attainment of said predetermined upper voltage limit causing a magnetic field to be induced in said core of such polarity that said polarized extremity of said latch is pivoted in a first direction to cause said latch to prevent said transfer of mechanical energy, thereby halting the generation of electrical energy by said generator means, the energizing of the other of said latch windings by said sensing means in response to the attainment of said predetermined lower voltage limit causing a magnetic field to be induced in said core of such polarity that said polarized extremity of said latch is pivoted in a second direction to cause said latch to allow said transfer of mechanical energy, thereby permitting the generation of electrical energy by said generator means.

3. An electrical generating system as defined in claim 2 wherein said generator means comprises a permanent magnet rotor and a stator having a winding disposed thereon, said stator winding having a pair of terminals.

4. An electrical generating system as defined in claim 3 wherein said generator means is an alternator.

5. An electrical generating system as defined in claim 3 wherein said storage means is a capacitor having a pair of terminals, across which said stored electrical energy is available for utilization.

6. An electrical generating system as defined in claim 5 further including rectifier means having input terminals coupled to said stator winding terminals and output terminals coupled to said capacitor terminals.

7. An electrical generating system as defined in claim 6 further characterized in that said rectifier means include four diodes arranged in a full-wave briedge configuration.

8. An electrical generating system as defined in claim 6 wherein said means for sensing said predetermined upper voltage limit comprises a Zener diode and a first resistor connected in series across said stator winding terminals, and a silicon controlled rectifier connected in series with one of said pair of latch windings across said stator winding terminals, said silicon controlled rectifier having a gate electrode connected to the junction of said Zener diode and said first resistor, said means for sensing said predetermined lower voltage limit comprising a transistor having input, output, and control electrodes, a first diode coupling said transistor control electrode to a terminal of said capacitor, a secondary capacitor having first and second terminals, a series connected second diode and a second resistor coupling said secondary capacitor terminals to an output terminal of said rectifier means, said secondary capacitor second terminal being connected to a reference potential, a silicon controlled rectifier connected in series with the other of said pair of latch windings across said secondary capacitor terminals, said silicon controlled rectifier having a gate electrode connected to said transistor output electrode, a third resistor coupling said last-mentioned gate electrode and said transistor output electrode in common to said reference potential, said transistor input electrode being connected to said secondary capacitor first terminal, and a fourth resistor coupling said transistor input and control electrodes to each other.

9. An electrical generating system as defined in claim 8 wherein said source of mechanical energy is a coiled spring, said generator means being operatively connected to said spring through a torque reducing gear train.

10. An electrical generating system as defined in claim 9 further characterized in that the opposite extremity of said pivotal latch is in the form of a tang, the pivoting of the polarized extremity of said latch in said first direction causing said tang to engage a tooth of a selected gear in said train, thereby preventing the movement of said gear train, the pivoting of the polarized extremity of said latch in said second direction causing said tang to be withdrawn from contact with said gear tooth, thereby permitting the movement of said train.

* * * * *